United States Patent
Zhao et al.

(10) Patent No.: US 9,886,473 B2
(45) Date of Patent: Feb. 6, 2018

(54) MANAGING JOB STATUS

(71) Applicant: Pivotal Software, Inc., San Francisco, CA (US)

(72) Inventors: Yanhui Zhao, Beijing (CN); Xiaoming Gao, Beijing (CN); Leng Han, Beijing (CN); Xiong Li, Beijing (CN); Ye Li, Beijing (CN)

(73) Assignee: Pivotal Software, Inc., San Francisco, CA (US)

( * ) Notice: Subject to any disclaimer, the term of this patent is extended or adjusted under 35 U.S.C. 154(b) by 564 days.

(21) Appl. No.: 14/539,072

(22) Filed: Nov. 12, 2014

(65) Prior Publication Data
US 2015/0134695 A1 May 14, 2015

Related U.S. Application Data

(63) Continuation of application No. PCT/CN2013/086987, filed on Nov. 12, 2013.

(51) Int. Cl.
*G06F 17/30* (2006.01)
*G06F 11/34* (2006.01)
*G06F 11/30* (2006.01)
*H04L 29/08* (2006.01)

(52) U.S. Cl.
CPC .... *G06F 17/30386* (2013.01); *G06F 11/3006* (2013.01); *G06F 11/3065* (2013.01); *G06F 11/3495* (2013.01); *G06F 17/30289* (2013.01); *G06F 17/30557* (2013.01); *G06F 17/30587* (2013.01); *H04L 67/10* (2013.01)

(58) Field of Classification Search
CPC ......... G06F 17/30386; G06F 17/30289; G06F 17/30557; G06F 17/30587; G06F 11/3006; G06F 11/3065; G06F 11/3495; H04L 67/10
See application file for complete search history.

(56) References Cited

U.S. PATENT DOCUMENTS

| 6,128,657 | A | 10/2000 | Okanoya et al. | |
|---|---|---|---|---|
| 8,843,930 | B2 * | 9/2014 | George | G06F 9/4843 718/100 |
| 2003/0120704 | A1 * | 6/2003 | Tran | G06F 9/4843 718/104 |

(Continued)

OTHER PUBLICATIONS

International Search Report and Written Opinion in International Application No. PCT/CN2013/086987, dated Aug. 13, 2014, 13 pages.

(Continued)

*Primary Examiner* — Huawen A Peng
(74) *Attorney, Agent, or Firm* — Fish & Richardson P.C.

(57) ABSTRACT

Methods, systems, and apparatus, including computer programs encoded on computer storage media, for job management. One of the methods includes receiving a status report for each of a plurality of jobs from a pluggable status reporter. The jobs are executed by applications in a distributed computing system. The applications are developed in at least two different software frameworks. A job type for each job is determined. A specific status handler associated with the job type is selected to determine specified status information for the job. The specified status information is stored and associated with the job in a status database.

33 Claims, 3 Drawing Sheets

(56) References Cited

U.S. PATENT DOCUMENTS

| | | |
|---|---|---|
| 2003/0225918 A1 | 12/2003 | Mayes et al. |
| 2006/0075408 A1 | 4/2006 | Powers et al. |
| 2010/0114789 A1 | 5/2010 | Dane |
| 2011/0106951 A1 | 5/2011 | Akiyama et al. |
| 2011/0296404 A1* | 12/2011 | Zhang ........................ G06F 8/68 717/178 |
| 2012/0124126 A1 | 5/2012 | Alcazar et al. |

OTHER PUBLICATIONS

European Extended Search Report for Application No. 13897516.4, dated Jun. 12, 2017, 11 pages.

\* cited by examiner

MANAGING JOB STATUS

TECHNICAL FIELD

This disclosure relates generally to data analysis and more particularly to managing jobs executed in a distributed computing system.

BACKGROUND

In cloud computing, a distributed computing system can execute various kinds of jobs by distributing tasks across multiple computers connected by one or more data communications networks. Each computer can host one or more servers, each of which executes a portion of the tasks for the jobs. The servers can process the data in parallel. In some cases, the jobs may be synchronous or asynchronous. It can be challenging to manage (e.g., monitor, query, or debug) the processing or execution status of the jobs with high efficiency and sufficient details.

SUMMARY

This specification describes technologies relating to managing jobs executed in a distributed computing system with high speed and sufficient details. The technologies can manage status of a plurality of jobs executed by applications that are developed in different software frameworks.

In general, one innovative aspect of the subject matter described in this specification can be embodied in methods that include the actions of receiving a status report for each job of a plurality of jobs, the jobs being executed in a distributed computing system including a plurality of computers, the jobs including at least a first job executed by a first application developed in a first software framework and a second job executed by a second application developed in a second software framework different from the first software framework; determining a respective job type for each of the jobs; and determining, for each of the jobs, that the job type for the job is stored in a first database, the first database associating job types to respective status handlers, and in response: selecting a respective status handler associated with the job type from the first database; determining, with the respective status handler, specified status information of the job based on the status report of the job; storing the specified status information in a second database; and associating the specified status information with the job in the second database. Other embodiments of this aspect include corresponding systems, apparatus, and computer programs, configured to perform the actions of the methods, encoded on computer storage devices. For a system of one or more computers to be configured to perform particular operations or action [0001] s means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

The foregoing and other embodiments can each optionally include one or more of the following features, alone or in combination.

In some implementations, each of the first and second software frameworks includes respective support programs, compilers, code libraries, tool sets, and application programming interfaces that enable development of applications, products, and/or solutions. Determining a respective job type for each of the jobs can include determining a specific software framework, the job being executed by a specific application developed in the specific software framework, and the job type is associated with the specific application and the specific software framework.

In some implementations, receiving a status report for each job of a plurality of jobs includes receiving a first status report of the first job from a first status reporter in a first computer of the plurality of computers, the first job being executed by the first application in the first computer and the first status reporter is associated with the first computer; receiving a second status report of the second job from a second status reporter in a second computer of the plurality of computers, the second job being executed by the second application in the second computer and the second status reporter is associated with the second computer, and the first status reporter and the second status reporter are instances of a same status reporter application.

In some examples, the first status reporter, together with the first application, is executed in the first software framework, and the second status reporter, together with the second application, is executed in the second software framework.

In some implementations, receiving a status report for each job of a plurality of jobs includes receiving a status report of a particular job. The status report can be generated at a time point after completion of executing the particular job in the distributed computing system.

In some implementations, the actions further include receiving a first status report for a first step of a particular job, the particular job including a plurality of steps to be executed in the distributed computing system. The first status report for the first step can be generated at a generation time point. The generation time point can be at a beginning of execution of the first step, at a first time point during the execution, at an end of the execution, or at a second time point after the execution. In some examples, the actions further include determining that the first status report of the first step is received, and in response, transmitting a trigger signal to continue executing the particular job in the distributed computing system. In some other examples, the plurality of steps of the particular job is executed based on a pre-determined schedule for the particular job. The pre-determined schedule can be scheduled by a job scheduler, the job scheduler scheduling the plurality of steps of the particular job to be executed in the distributed computing system.

In some implementations, each step of the plurality of steps is scheduled to be executed in a respective computer of the plurality of computers in the distributed computing system. The actions further include receiving one or more status reports for the step from a respective status reporter in the respective computer. In some examples, the actions further include determining a respective step type for each of the plurality of steps; and determining, for each of the steps, that the step type for the step is stored in a third database, the third database associating step types to respective step status handlers, and in response: selecting a respective step status handler associated with the step type from the third database; determining, with the respective step status handler, specified step status information of the step based on the one or more status reports of the step; storing the specified step status information in the second database; and associating the specified step status information with the step of the particular job in the second database.

In some implementations, determining specified status information of the job based on the status report of the job includes determining specified status information of the job based on one or more rules that are pre-configured for the respective status handler. In some examples, the respective status handlers associated with the job types in the first database are instances of a same status handler application.

In some implementations, the actions further include receiving a request of querying status of a particular job; retrieving, based on the request, relevant status information from the second database; and outputting the relevant status information. In some examples, retrieving relevant status information includes filtering, based on the request, respective status information associated with the particular job in the second database to retrieve the relevant status information. In some examples, outputting the relevant status information includes sending instructions to a user computer for displaying the relevant status information in a graphical user interface (GUI).

Particular embodiments of the subject matter described in this specification can be implemented so as to realize one or more advantages. Execution or processing status for jobs (e.g., different types of jobs executed in different software frameworks, jobs with multiple complex steps, or synchronous or asynchronous jobs) can be managed. A pluggable job status reporter can be easily integrated with existing applications or systems and report status reports for different types of jobs or multiple complex steps of a particular job. A pluggable specific job status handler can analyze status reports for the jobs to determine most valuable information on execution of the jobs. A user can query execution status of jobs with high efficiency and sufficient details.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
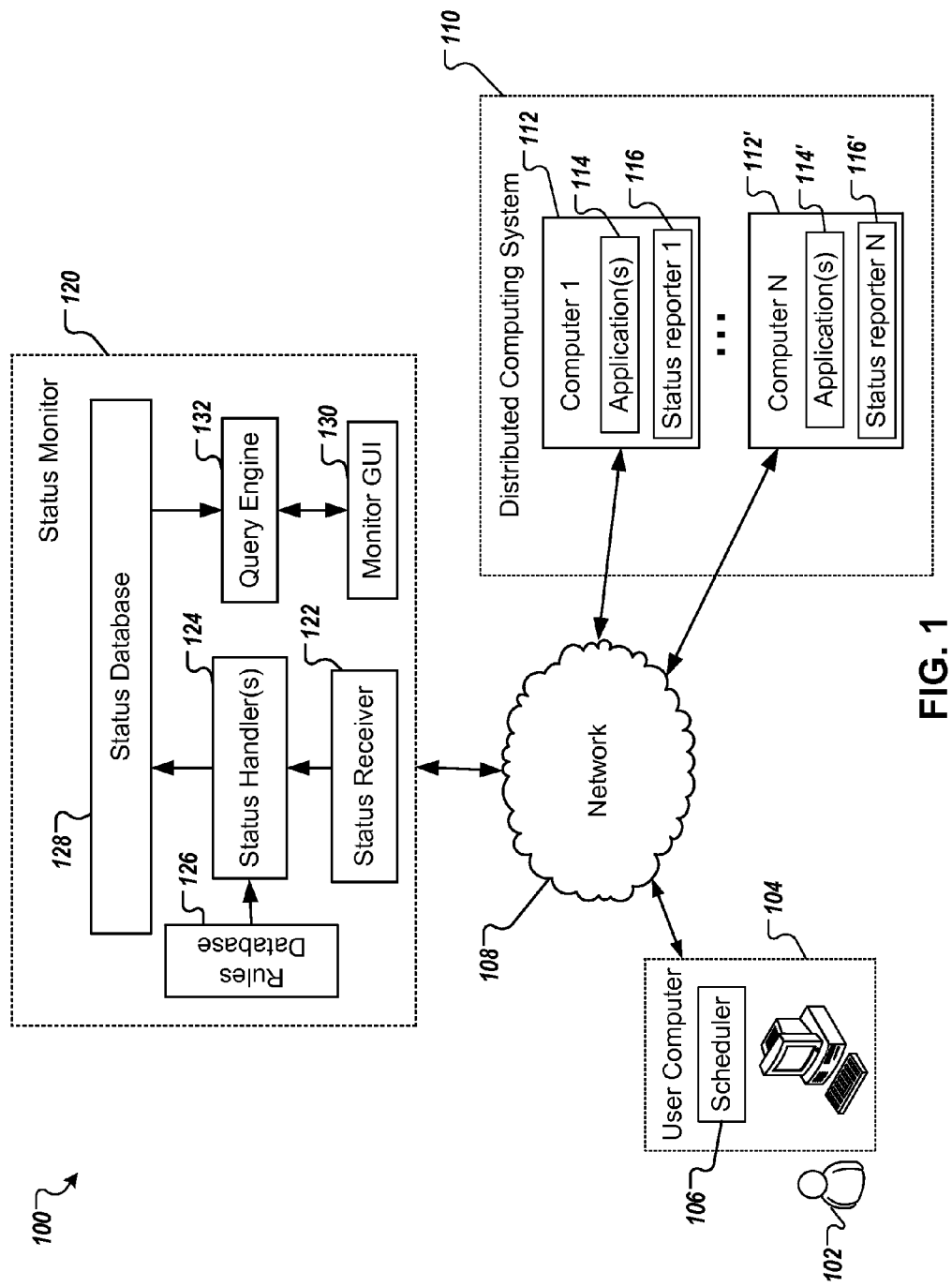
FIG. 1 is a block diagram of an example system architecture in accordance with implementations of the present disclosure.

FIG. 1 is a block diagram of an example system architecture 100 for managing jobs. The example system architecture 100 includes a user 102 and a user computer 104, a distributed computing system 110, a status monitor 120, and a data communications network 108. In some implementations, the user 102 uses the user computer 104 to schedule jobs to be executed in the distributed computing system 110. The distributed computing system 110 monitors and submits execution status reports of the jobs to the status monitor 120. The status monitor 120 processes the status reports of the jobs to determine specified status information for the jobs, and stores the specified status information in a database for management.

In some implementations, the user computer 104, the distributed computing system 110, and the status monitor 120 communicate with one another over the network 108. In some examples, the network 108 can include a large computer network, such as a local area network (LAN), a wide area network (WAN), the Internet, a cellular network, or a combination thereof connecting any number of communication devices, computing devices, and/or server systems.

In some examples, the user 102 can be an administrator, an analyst, or an ordinary user of the system 100. The user computer 104 can be a server computer in a server system or a personal computer in the network 108. The user computer 104 can include any appropriate type of device such as a desktop computer, a personal computer, a notebook, a tablet computing device, a personal digital assistant (PDA), a network appliance, a smart mobile phone, an enhanced general packet radio service (EGPRS) mobile phone, a media player, a navigation device, an email device, a game console, or any appropriate combination of any two or more of these computing devices or other computing devices. In the example of FIG. 1, and as used by way of example throughout the remainder of the present disclosure, the user computer 104 is provided as a computer, such as a desktop computer.

In some implementations, a job scheduler 106 is installed and executed in the user computer 104. The job scheduler 106 can be used to create simple or complex schedules for executing multiple jobs (e.g., tens, hundreds, or tens-of-thousands of jobs). In some implementations, a scheduler can be installed in the distributed computing system 110, and the user 102 can use the scheduler in the distributed computing system to schedule the jobs.

The jobs may be repeated or periodic jobs. The jobs can be scheduled to run when a given trigger occurs. The trigger can be, e.g., created with any combination of the following directives: a certain time of a day, on certain days of a week, a month, or a year, repeated a specific number of times, repeated until a specific time/date, repeated indefinitely, repeated with a delayed interval, or a command signal. The job scheduler 106 can run as a stand-alone application or embedded within another free standing application. In some examples, the job scheduler 106 may be implemented based on Quartz, Linux Crontab, or the like.

In some implementations, the job scheduler 106 schedules the jobs to be executed in the distributed computing system 110. The distributed computing system 110 can include a cloud server or many distributed server systems. The distributed computing system 110 includes a plurality of computers (e.g., computer 112, and computer 112') in one or more locations connected by one or more data communications networks (e.g., the network 108). Each computer can be a physical computer or a virtual computer. The distributed computing system 110 can handle data intensive applications deployed in a virtualized environment.

In some implementations, each computer in the distributed computing system 110 includes one or more applications 114. The applications 114 can be used to execute the scheduled jobs submitted by the scheduler 106 in the computers. In some examples, different applications are developed or implemented in different software frameworks.

A software framework is an abstraction in which software providing generic functionality can be selectively changed by additional user-written code, thus providing application-specific software. Software frameworks can include support programs, compilers, code libraries, tool sets, and application programming interfaces (APIs) that bring together all the different components to enable development of an application, a project or a solution.

In some examples, the software frameworks can include frameworks from application frameworks, Ajax framework, web application frameworks, enterprise architecture frameworks, multimedia frameworks, or Cactus framework. In some examples, the application frameworks include .NET framework, Oracle Application Development Framework (Oracle ADF) or Java-based frameworks, Mozilla application framework, PowerPlant, Carbon, MacZoop, Cocoa, OpenStep, Qt, NetBeans, OWL, Hadoop, and Eclipse.

In some implementations, the jobs to be executed include different types of jobs that need to be executed by applications in different software frameworks. In some examples, a job can be only executed in a specific software framework. For example, a Hadoop job can be only executed in a Hadoop system. In some other examples, a job can be executed in two or more different software frameworks.

In some implementations, the user 102 can use the job scheduler 106 to schedule different types of jobs to different applications in the distributed computing system 110. For example, a Hadoop job can be submitted to the computer 112. The Hadoop job is executed by a Hadoop application (e.g., the application 114) in the computer 112 and the Hadoop application is developed in a Hadoop framework. A C++ based job can be submitted to the computer 112'. The C++ based job is executed by a windows application (e.g., the application 114') in the computer 112' and the windows application is developed in .NET framework.

In some implementations, each computer in the distributed computing system includes a job status reporter, respectively. For example, the computer 112 includes a job status reporter 116, and the computer 112' includes a job status reporter 116'. In some examples, the job status reporters (including the status reporters 116 and 116') are instances of a same status reporter application. The status reporter application can be pluggable and executed in different software frameworks. The status reporter application can be a stand-alone application or embedded within another free standing application. Thus, the status reporter application can be utilized to monitor execution or processing status of the jobs executed by applications in different software frameworks.

For example, the pluggable status reporter application can be executed in a Hadoop framework, thus the status reporter 116 based on the pluggable status reporter application can monitor a Hadoop job executed by a Hadoop application (e.g., the application 114) in the Hadoop framework. The pluggable status reporter application can be executed in .NET framework, thus the status reporter 116' based on the pluggable status reporter application can monitor a C++ based job by a windows application (e.g., the application 114') in .NET framework.

In some implementations, the job status reporters monitor the execution or processing status of the jobs executed by the applications in the computers in the distributed computing system 110. The job status reporters can also generate and output status reports for the executed jobs. Each job status reporter can correspond to one of the computers. In some examples, a job is a synchronous job. A job status reporter may generate a status report for the synchronous job after (e.g., immediately after) completion of executing the synchronous job. In some other examples, a job is an asynchronous job. A job status reporter may generate a status report for the asynchronous job at some time later after completion of executing the asynchronous job.

In some implementations, the jobs include multiple execution steps. The scheduler 106 can schedule the multiple steps to be executed in one or more computers in the distributed computing system 110. The multiple steps can be executed simultaneously or sequentially.

The job status reporters can generate one or more status reports for each step of the jobs. For example, when a first step of a job is initiated, the job status reporter can generate a status report to report the initiation information of the first step. During the execution of the first step, the job status reporter can also generate one or more status reports to report the executing status of the first step. The job status report can include detail processing messages, such as how much data has been processed, how much data is left, how much time is required to finish the first step or all the remaining steps of the job, or what is the next step. After the first step is completed, the job status reporter can generate a status report to report the execution information of the first step, e.g., a successful completion message, a failure message, or an unexpected message.

A job status reporter can be configured (e.g., by the scheduler 106) to submit the status reports of the job synchronously or asynchronously. In some implementations, the job status reporter submits the status reports of the job synchronously. For example, after the first step is completed, the job status reporter submits a status report of the first step to a status monitor (e.g., the status monitor 120). The job is paused. Until the computer or the distributed computing system where the job is executed receives a trigger signal from the status monitor that confirms the status report of the first step is received and/or stored, the job continues to run a second step following the first step.

In some other implementations, the job status reporter submits the status reports of the job asynchronously. For example, the multiple steps of the job are executed based on a pre-determined schedule for the job. After the first step is completed, the job status reporter submits a status report of the first step to the status monitor. The job continues to the second step based on the pre-determined schedule, without waiting for a trigger signal from the status monitor.

Referring back to FIG. 1, the status monitor 120 can be in a server system (e.g., a cloud server). In some implementations, the status monitor 120 is an application executing on a system of one or more computers. The status monitor 120 can be executed on the distributed computing system 110. In some implementations, the distributed computing system 110 and the status monitor 120 can be within a same server system. In some implementations, the user computer 104, the distributed computing system 110 and the status monitor 120 can be within a same server system.

In some implementations, the status monitor 120 includes a job status receiver 122, one or more job status handlers 124, a rules database 126, a status database 128, a monitor GUI 130 and a query engine 132. The job status receiver 122 is used to receive status reports of jobs submitted by the status reporters in the distributed computing system 110 (e.g., the status reporters 116 and 116').

In some implementations, the jobs can include different types of jobs, as discussed above. To analyze status reports of the different types of jobs, the status monitor 120 may include multiple specific status handlers 124. A specific status handler 124 can be pre-configured with one or more rules (e.g., from the rules database 126) that are suitable to analyze status reports of some specific types of jobs. The rules database 126 can associate specific status handlers with respective types of jobs. In some examples, a specific status handler can be associated with one or more types of jobs.

In some implementations, all the specific status handlers 124 are instances of a same status handler application. In some examples, the status handler application can be pluggable and executed in different software frameworks. The status handler application can be a stand-alone application or embedded within another free standing application. Thus, the status handler application can be utilized to analyze execution or processing status of the jobs executed by applications in different software frameworks. In some examples, the status handler application can include specific rules from the rules database 126 and be used as a specific status handler for a specific job type.

When the status receiver 122 receives a status report of a particular job, the status monitor 120 can determine the job type for the particular job, and then select a respective specific status handler associated with the job type from the rules database 126. The specific status handler can analyze the status report of the particular job to determine specified status information of the particular job. For example, the specified status information may be information that a user or another process has identified as being particularly valuable on the execution of the particular job, such as a failure message on a specific step of the particular job. The specified status information can include detailed messages on the most valuable information. Redundancy information on the execution status of the job may be thrown away, and the specified status information may be much less than the information in the status report of the particular job.

In some implementations, the specified status information of the particular job is stored in the status database 128. The status database 128 associates the specified status information with the particular job and/or the generation time of the status report. In some implementations, the status database includes two components. The first component stores the determined status information, and the second component stores the status report of the job. When receiving a query, the query engine 132 can first search the first component in the status database 128 to quickly retrieve relevant status information. In some examples, if the desired information cannot be found in the first component, the query engine 132 can then search the second component in the status database 128.

In some implementations, as the stored specified status information only includes most valuable information that is much less the original status report, the execution status of the job can be quickly found in the status database 128. Moreover, the stored specified status information includes detailed messages on the most valuable information, thus the searched result can provide sufficient details that the user 102 really cares about.

In some implementations, the status monitor 120 includes the monitor GUI 130. The user 102 can use the monitor GUI 130 to submit a request for querying execution status of a job, and the query engine can process the request to retrieve relevant status information from the status database 128, and output the relevant status information to the monitor GUI 130. Instructions can be also sent to the user computer 104 to display the relevant status information.

In some implementations, a particular job includes multiple complex steps. For example, an analyst manages sales data of a store, and the job may include: indexing sales data for each product in the store, accumulating sales data for each product per day, and processing the accumulated sales data at the end of each month. In some examples, each step of the particular job is scheduled to a respective computer in the distributed computing system 110. Each computer can include a pluggable job status reporter to monitor, generate and report the processing or executing status for the corresponding step of the multiple complex steps of the job.

In some implementations, the multiple steps of the particular job are executed in the respective distributed computers in parallel. The pluggable job status reporters in the distributed computers report status reports for the multiple steps independently. In some other implementations, the multiple steps of the particular job are executed in the distributed computers sequentially. The pluggable job status reporters in the distributed computers report status reports for the multiple steps synchronously.

In some implementations, after a first step of the particular job is completed in a first computer, the first status reporter transmits a status report for the first step to the status monitor 120. The status monitor 120 can analyze the status report to determine completion of the first step and send a confirmation signal to the distributed computing system 110. In some examples, the status monitor 120 sends the conformation signal back to the first computer, and the first computer then sends a trigger signal to a second computer for executing a second step (following the first step) in the second computer. In some examples, the distributed computing system includes a central controller. After receiving the conformation signal from the status monitor 120, the central controller can send a trigger signal to the second computer to execute the second step.

In some implementations, the status monitor 120 includes specific step status handlers for different step types of multiplex complex steps in a particular job. The specific step status handlers can include one or more specific rules to analyze each step type for the complex steps. In some examples, the status monitor 120 includes a database for associating different step types of the complex steps with respective specific step status handlers. In some examples, after receiving a status report for a complex step, the status monitor 120 determines whether a respective step type for the complex step is in the database. In response that the step type for the complex step is in the database, the respective step status handler associated with the complex step in the database is selected to analyze the status report for the complex step. The step status handler can process the status report to determine most valuable status information for the complex step. The most valuable status information for the complex step can be stored and associated with the complex step of the particular job in a status database (e.g., the status database 128).

Figure 2:
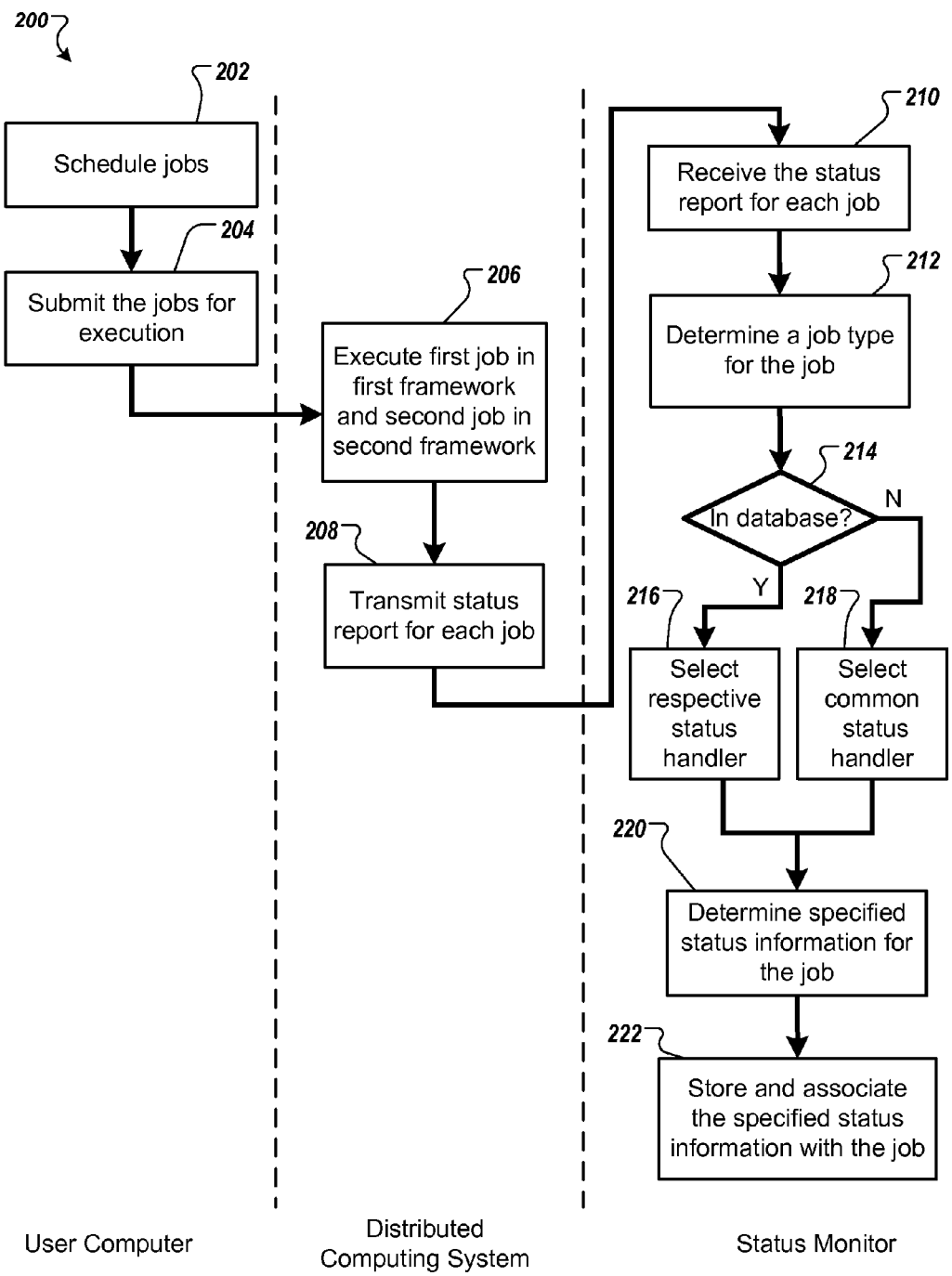
FIG. 2 depicts an example process that can be executed in accordance with implementations of the present disclosure.

FIG. 2 depicts an example process 200 that can be executed in accordance with implementations of the present disclosure. The process 200 can be performed by a user computer (e.g., the user computer 104 of FIG. 1), a distributed computing system (e.g., the distributed computing system 110 of FIG. 1), and a status monitor (e.g., the status monitor 120 of FIG. 1).

Jobs are scheduled (202). In some implementations, the jobs can be scheduled by a scheduler (e.g., the scheduler 106 of FIG. 1) in the user computer by a user (e.g., the user 102 of FIG. 1). In some implementations, the scheduler can be installed in the distributed computing system, and the user can use the scheduler in the distributed computing system to schedule the jobs.

In some examples, the jobs include a plurality of steps to be executed. The scheduler can submit the plurality of steps to one or more computers in the distributed computing system. In some examples, the jobs include different types of jobs. The scheduler can schedule the different types of jobs to specific applications executed in multiple computers of the distributed computing system. The specific applications may be developed in specific software frameworks that correspond to the types of jobs.

The jobs are submitted for execution (204). In some implementations, the scheduler submits the jobs to the distributed computing system for execution. The scheduler can submit a first job to be executed by a first application in a first computer. The first application is developed in a first software framework. The scheduler can submit a second job to be executed by a second application in a second computer. The second application is developed in a second software framework that is different from the first software framework.

After receiving the scheduled jobs, the distributed computing system starts to execute the jobs. The first job is executed in the first software framework and the second job is executed in the second software framework (206). In some implementations, the first job is executed by the first application that is developed in the first software framework. The second job is executed by the second application that is developed in the second software framework.

A status report for each job is transmitted (208). In some implementations, each computer in the distributed computing system includes a job status reporter (e.g., the status reporter 116 or 116' of FIG. 1). The status reporter can be an instance of a pluggable status reporter application that can be executed in different software frameworks. The status reporter monitors the execution or processing status of the job executed in the computer, generates and transmits the status report of the job. For example, the first job is executed in a first computer, and a first status reporter in the first computer monitors, generates and transmits a first status report of the first job to the status monitor. While the second job is executed in a second computer, and a second status reporter in the second computer monitors, generates, and transmits a second status report of the second job to the status monitor.

In some examples, a job includes a plurality of steps to be executed in a computer. A corresponding status reporter can submit one or more status reports of the steps for the job to the status monitor. The status reporter can submit the one or more status reports of the job synchronously or asynchronously. In some other examples, a job includes a plurality of steps to be executed in many distributed computers in the distributed computing systems. The status reporters in the distributed computers can submit the status reports of steps for the job to the status monitor. The status reporters can submit the status reports of the job synchronously or asynchronously.

The status report for each job is received (210). The status monitor can include a job status receiver (e.g., the status receiver 122 of FIG. 1) to receive the status report for the job.

A job type for the job is determined (212). In some implementations, the status monitor processes the status report of the job to determine a specific job type for the job. In some examples, the job type for the job is determined based on information stored in a rules database (e.g., the rules database 126 of FIG. 1). The rules database stores a plurality of job types and a plurality of specific status handlers (e.g., the status handlers 124 of FIG. 1).

In some implementations, the status handlers are instances of a pluggable status handler application. The pluggable status handler application can be executed in different software frameworks and analyze status reports of jobs executed in the software frameworks. The job status handlers are associated with respective job types in the rules database, and can be used to analyze the respective job types.

The status monitor determines whether or not the job type for the job is stored in the rules database (214). If the job type is stored in the rules database, a respective status handler associated with the job type is selected from the rules database (216). The respective status handler includes one or more pre-configured rules that can be used to analyze the status report of the specific job type.

If the job type is not stored in the rules database, a common status handler can be selected from the rules database (218). The common status handler includes one or more common rules to analyze status reports of any type of jobs. In some examples, a new status handler can be developed, based on the pluggable status handler application, to analyze the job type. The new status handler and the job type can be stored and associated in the rules database. In some examples, the status report of the job is directly stored in a status database, without being analyzed by any status handler.

Specified status information for the job is determined (220). The selected status handler (e.g., the respective status handler or the common status handler) analyzes the status report of the job, and determines the specified status information for the job. The specified status information may include most valuable information on execution status of the job. The specified status information can be much less than the status report in size. The specified status information may also include generation time of the status report.

The specified status information is stored and associated with the job (222). In some implementations, the status monitor includes a status database (e.g., the status database 128 of FIG. 1). The specified status information is stored in the status database, and the status database can associate the specified status information with the job and/or the generation time of the status report.

Figure 3:
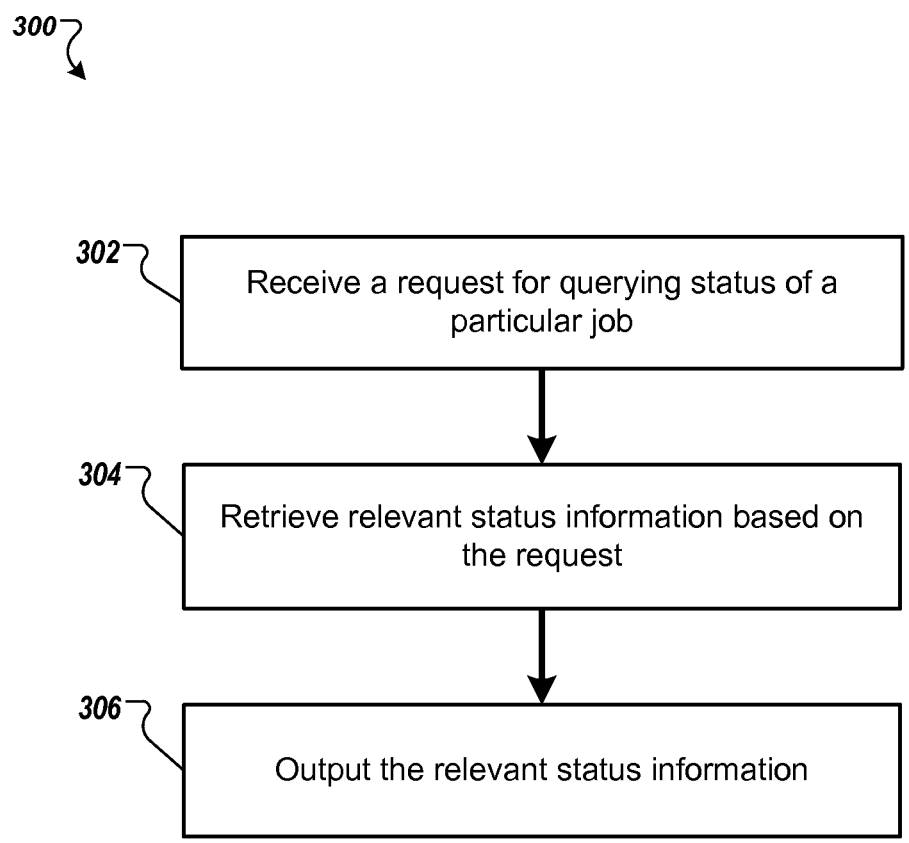
FIG. 3 depicts an example process that can be executed in accordance with implementations of the present disclosure.

FIG. 3 depicts an example process 300 that can be executed in accordance with implementations of the present disclosure. The process 300 can be implemented by a status monitor (e.g., the status monitor 120 of FIG. 1 or the status monitor of FIG. 2).

A request for querying status of a particular job is received (302). In some implementations, the status monitor provides a user interface (e.g., the monitor GUI 130 of FIG. 1). A user (e.g., the user 102 of FIG. 1) can use a user computer (e.g., the user computer 104 of FIG. 1) to submit the querying request in the user interface. The user interface can transmit the request to a query engine (e.g., the query engine 132) in the status monitor.

Relevant status information is retrieved based on the request (304). In some implementations, the status monitor includes a status database (e.g., the status database 128 of FIG. 1 or the status database of FIG. 2). The status database stores specified status information and respective job information. The query engine can search the status database and filter, based on the request, respective specified status information associated with the particular job to retrieve the relevant status information. For example, the user may want to debug failure steps for the particular job. The query engine can filter the respective status information for the particular job to identify status information relevant to failure steps during execution of the particular job.

In some implementations, the status database includes first and second components. The first component only stores specified status information for jobs, and the second component stores status reports for jobs. In some examples, the query engine can first search the first component in the status database to identify relevant status information to expedite searching speed. If the relevant status information is not found or not satisfied by the user, the query engine can further search the second component to identify information that the user is interested in.

The relevant status information is outputted (306). In some implementations, the status monitor or the query engine can output the retrieved relevant status information to the user interface for displaying in the user computer.

Embodiments of the subject matter and the functional operations described in this specification can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
executing, by a plurality of computers of a distributed computing system, a plurality of respective job status reporter applications, each respective job status reporter application being configured to generate job status reports specific to jobs performed by applications developed in a respective software framework,
wherein the jobs include at least a first job executed by a first computer and developed in a first software framework and a second job executed by a second computer and developed in a second software framework different from the first software framework;
generating, by a first job status reporter application specific to a first software framework, a first job status report for a first application executed by a first computer of the plurality of computers, the first application being a software application developed in the first software framework;
generating, by a second job status reporter application specific to a different second software framework, a second job status report for a second application executed by a second computer of the plurality of computers, the second application being a software application developed in the second software framework;
receiving, by a status monitor application executed by one or more of the plurality of computers in the distributed computing system, the first status report generated by the first job status reporter application and the second status report generated by the second job status reporter application;
determining, by the status monitor application, a first job type for the first job based on the first status report;
determining, by the status monitor application, a second job type for the second job based on the second status report;
determining, by the status monitor application for each of the first job and the second job, a respective status handler application specific to the respective job type from a first database that maps a plurality of job types to respective status handler applications, including identifying a first status handler application specific to a first job type of the first job and a different second status handler application specific to a second job type of the second job;

processing, by the first status handler application, the first status report generated by the first job status reporter application specific to the first software framework of the first job to generate first job status information using only a portion of data from the first status report;

processing, by the second status handler application, the second status report generated by the second job status reporter application specific to the second software framework of the second job to generate second job status information using only a portion of data from the second status report;

storing, by the first status handler application, the generated first job status information in association with the first job in a second database that maps a plurality of jobs to respective job status information; and storing, by the second status handler application, the generated second job status information in association with the second job in the second database.

2. The method of claim 1, wherein the first job status reporter application and the second job status reporter application are instances of a same job status reporter application.

3. The method of claim 1, wherein the first status report corresponds to a first step of the first job, the first job comprising a plurality of steps to be executed in the distributed computing system.

4. The method of claim 3, wherein the first status report for the first step is generated at a generation time point, the generation time point being at a beginning of execution of the first step, at a first time point during the execution of the first step, at an end of the execution of the first step, or at a second time point after the execution of the first step.

5. The method of claim 3, further comprising determining, by the status monitor application, that the first status report of the first step is received, and in response, transmitting, by the status monitor application, a trigger signal instructing the first computer to continue executing the first job in the distributed computing system.

6. The method of claim 3, wherein the plurality of steps of the particular job are executed based on a pre-determined schedule for the particular job.

7. The method of claim 6, wherein the pre-determined schedule is scheduled by a job scheduler, the job scheduler scheduling the plurality of steps of the particular job to be executed in the distributed computing system.

8. The method of claim 3, wherein each step of the plurality of steps is scheduled to be executed in a respective computer of the plurality of computers in the distributed computing system, and further comprising receiving one or more status reports for the step from a respective status reporter in the respective computer.

9. The method of claim 3, further comprising:
determining a respective step type for each of the plurality of steps; and
determining, for each of the steps, that the step type for the step is stored in a third database, the third database associating step types to respective step status handler applications, and in response:
selecting a respective step status handler application associated with the step type from the third database;
determining, with the respective step status handler application, specified step status information of the step based on the one or more status reports of the step;
storing the specified step status information in the second database; and
associating the specified step status information with the step of the first job in the second database.

10. The method of claim 1, wherein processing, by the first status handler application, the first status report generated by the first job status reporter application specific to the first software framework of the first job to generate first job status information comprises generating the first job status information of the first job based on one or more rules that are pre-configured for the first status handler application.

11. The method of claim 1, further comprising:
receiving a request to query a status of the first job;
retrieving, based on the request, relevant job status information from the second database; and
providing the first job status information for the first job in response to receiving the request.

12. A distributed computing system comprising:
a plurality of computers; and
one or more computer-readable storage devices storing instructions that are operable, when executed by the one or more computers, to cause the one or more computers to perform operations comprising:
executing, by a plurality of computers of the distributed computing system, a plurality of respective job status reporter applications, each respective job status reporter application being configured to generate job status reports specific to jobs performed by applications developed in a respective software framework,
wherein the jobs include at least a first job executed by a first computer and developed in a first software framework and a second job executed by a second computer and developed in a second software framework different from the first software framework;
generating, by a first job status reporter application specific to a first software framework, a first job status report for a first application executed by a first computer of the plurality of computers, the first application being a software application developed in the first software framework;
generating, by a second job status reporter application specific to a different second software framework, a second job status report for a second application executed by a second computer of the plurality of computers, the second application being a software application developed in the second software framework;
receiving, by a status monitor application executed by one or more of the plurality of computers in the distributed computing system, the first status report generated by the first job status reporter application and the second status report generated by the second job status reporter application;
determining, by the status monitor application, a first job type for the first job based on the first status report;
determining, by the status monitor application, a second job type for the second job based on the second status report;
determining, by the status monitor application for each of the first job and the second job, a respective status handler application specific to the respective job type from a first database that maps a plurality of job types to respective status handler applications, including identifying a first status handler application specific to a first job type of the first job and a different second status handler application specific to a second job type of the second job;

processing, by the first status handler application, the first status report generated by the first job status reporter application specific to the first software framework of the first job to generate first job status information using only a portion of data from the first status report;

processing, by the second status handler application, the second status report generated by the second job status reporter application specific to the second software framework of the second job to generate second job status information using only a portion of data from the second status report storing, by the first status handler application, the generated first job status information in association with the first job in a second database that maps a plurality of jobs to respective job status information; and storing, by the second status handler application, the generated second job status information in association with the second job in the second database.

13. The system of claim 12, wherein the first job status reporter application and the second job status reporter application are instances of a same job status reporter application.

14. The system of claim 12, wherein the first status report corresponds to a first step of the first job, the first job comprising a plurality of steps to be executed in the distributed computing system.

15. The system of claim 14, wherein the first status report for the first step is generated at a generation time point, the generation time point being at a beginning of execution of the first step, at a first time point during the execution of the first step, at an end of the execution of the first step, or at a second time point after the execution of the first step.

16. The system of claim 14, the operations further comprising determining, by the status monitor application, that the first status report of the first step is received, and in response, transmitting, by the status monitor application, a trigger signal instructing the first computer to continue executing the first job in the distributed computing system.

17. The system of claim 14, wherein the plurality of steps of the particular job are executed based on a pre-determined schedule for the particular job.

18. The system of claim 17, wherein the pre-determined schedule is scheduled by a job scheduler, the job scheduler scheduling the plurality of steps of the particular job to be executed in the distributed computing system.

19. The system of claim 14, wherein each step of the plurality of steps is scheduled to be executed in a respective computer of the plurality of computers in the distributed computing system, and further comprising receiving one or more status reports for the step from a respective status reporter in the respective computer.

20. The system of claim 14, the operations further comprising:

determining a respective step type for each of the plurality of steps; and determining, for each of the steps, that the step type for the step is stored in a third database, the third database associating step types to respective step status handler applications, and in response:

selecting a respective step status handler application associated with the step type from the third database;

determining, with the respective step status handler application, specified step status information of the step based on the one or more status reports of the step;

storing the specified step status information in the second database; and associating the specified step status information with the step of the first job in the second database.

21. The system of claim 12, wherein processing, by the first status handler application, the first status report generated by the first job status reporter application specific to the first software framework of the first job to generate first job status information comprises generating the first job status information of the first job based on one or more rules that are pre-configured for the first status handler application.

22. The system of claim 12, the operations further comprising:

receiving a request to query a status of the first job;

retrieving, based on the request, relevant job status information from the second database; and providing the first job status information for the first job in response to the request.

23. A computer program product, encoded on one or more non-transitory computer storage media, comprising instructions that, when executed by one or more computers of a distributed computing system, cause the one or more computers to perform operations comprising:

executing, by a plurality of computers of the distributed computing system, a plurality of respective job status reporter applications, each respective job status reporter application being configured to generate job status reports specific to jobs performed by applications developed in a respective software framework, wherein the jobs include at least a first job executed by a first computer and developed in a first software framework and a second job executed by a second computer and developed in a second software framework different from the first software framework;

generating, by a first job status reporter application specific to a first software framework, a first job status report for a first application executed by a first computer of the plurality of computers, the first application being a software application developed in the first software framework;

generating, by a second job status reporter application specific to a different second software framework, a second job status report for a second application executed by a second computer of the plurality of computers, the second application being a software application developed in the second software framework;

receiving, by a status monitor application executed by one or more of the plurality of computers in the distributed computing system, the first status report generated by the first job status reporter application and the second status report generated by the second job status reporter application;

determining, by the status monitor application, a first job type for the first job based on the first status report;

determining, by the status monitor application, a second job type for the second job based on the second status report;

determining, by the status monitor application for each of the first job and the second job, a respective status handler application specific to the respective job type from a first database that maps a plurality of job types to respective status handler applications, including identifying a first status handler application specific to a first job type of the first job and a different second status handler application specific to a second job type of the second job;

processing, by the first status handler application, the first status report generated by the first job status reporter application specific to the first software framework of the first job to generate first job status information using only a portion of data from the first status report;

processing, by the second status handler application, the second status report generated by the second job status reporter application specific to the second software framework of the second job to generate second job status information using only a portion of data from the second status report storing, by the first status handler application, the generated first job status information in association with the first job in a second database that maps a plurality of jobs to respective job status information; and storing, by the second status handler application, the generated second job status information in association with the second job in the second database.

24. The computer program product of claim 23, wherein the first job status reporter application and the second job status reporter application are instances of a same job status reporter application.

25. The computer program product of claim 23, wherein the first status report corresponds to a first step of the first job, the first job comprising a plurality of steps to be executed in the distributed computing system.

26. The computer program product of claim 25, wherein the first status report for the first step is generated at a generation time point, the generation time point being at a beginning of execution of the first step, at a first time point during the execution of the first step, at an end of the execution of the first step, or at a second time point after the execution of the first step.

27. The computer program product of claim 25, the operations further comprising determining, by the status monitor application, that the first status report of the first step is received, and in response, transmitting, by the status monitor application, a trigger signal instructing the first computer to continue executing the first job in the distributed computing system.

28. The computer program product of claim 25, wherein the plurality of steps of the particular job are executed based on a pre-determined schedule for the particular job.

29. The computer program product of claim 28, wherein the pre-determined schedule is scheduled by a job scheduler, the job scheduler scheduling the plurality of steps of the particular job to be executed in the distributed computing system.

30. The computer program product of claim 25, wherein each step of the plurality of steps is scheduled to be executed in a respective computer of the plurality of computers in the distributed computing system, and further comprising receiving one or more status reports for the step from a respective status reporter in the respective computer.

31. The computer program product of claim 25, the operations further comprising:

determining a respective step type for each of the plurality of steps; and determining, for each of the steps, that the step type for the step is stored in a third database, the third database associating step types to respective step status handler applications, and in response:

selecting a respective step status handler application associated with the step type from the third database;

determining, with the respective step status handler application, specified step status information of the step based on the one or more status reports of the step;

storing the specified step status information in the second database; and associating the specified step status information with the step of the first job in the second database.

32. The computer program product of claim 23, wherein processing, by the first status handler application, the first status report generated by the first job status reporter application specific to the first software framework of the first job to generate first job status information comprises generating the first job status information of the first job based on one or more rules that are pre-configured for the first status handler application.

33. The computer program product of claim 23, the operations further comprising:

receiving a request to query a status of the first job;

retrieving, based on the request, relevant job status information from the second database; and providing the first job status information for the first job in response to the request.

* * * * *